Oct. 8, 1957      L. H. NICHOLAS      2,808,952
CARRYING APPARATUS
Filed June 13, 1956      3 Sheets-Sheet 1
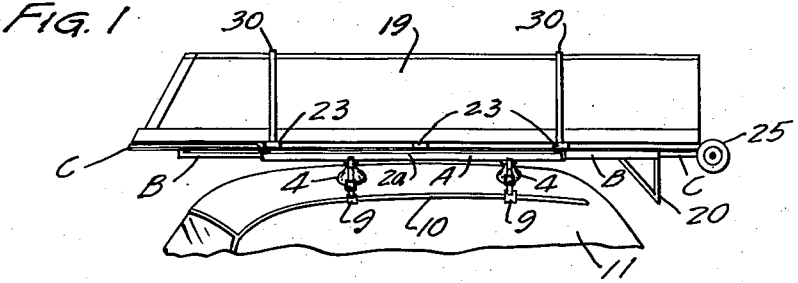
INVENTOR
LAWRENCE H. NICHOLAS
BY Mark W. Gehan
ATTORNEY

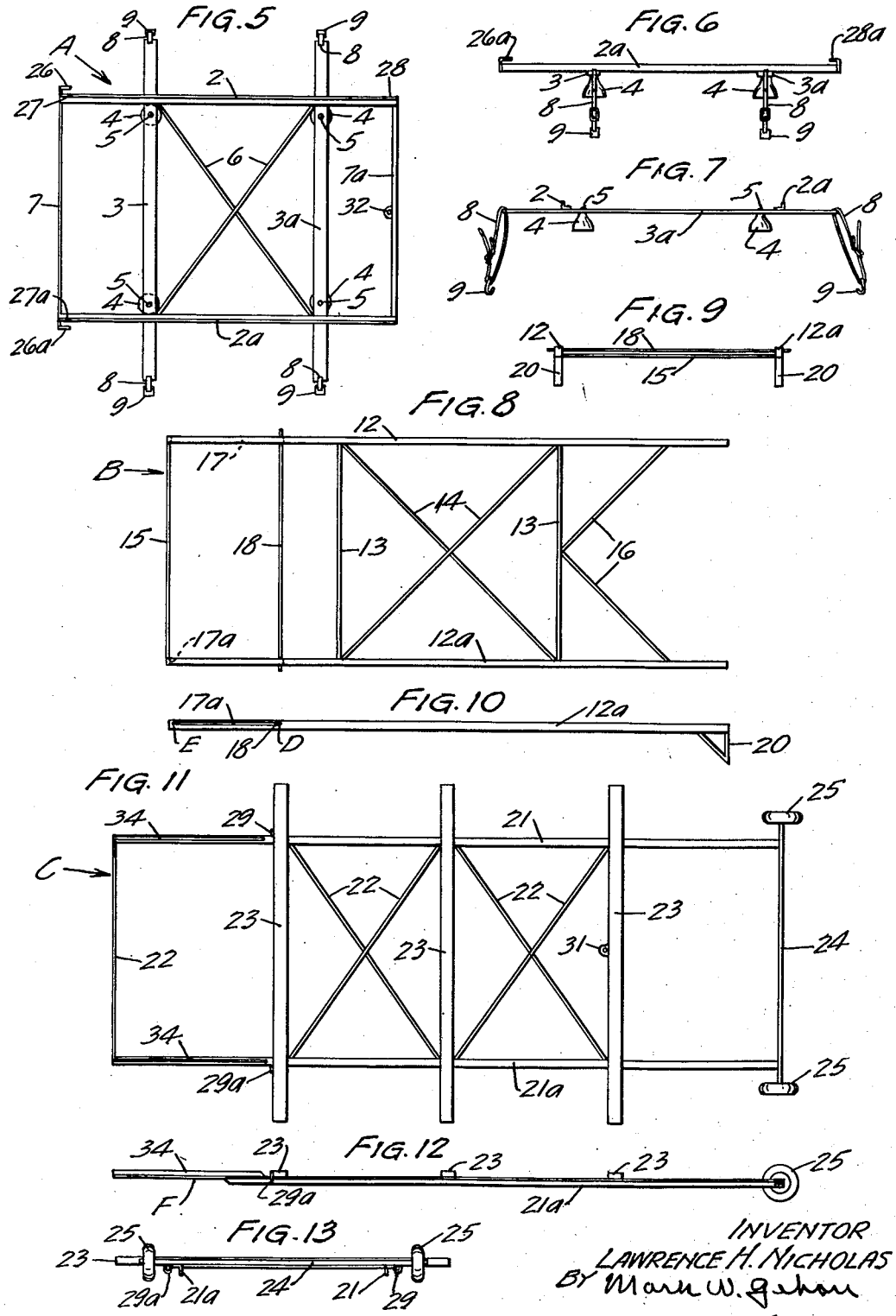

Oct. 8, 1957
L. H. NICHOLAS
2,808,952
CARRYING APPARATUS
Filed June 13, 1956
3 Sheets-Sheet 3
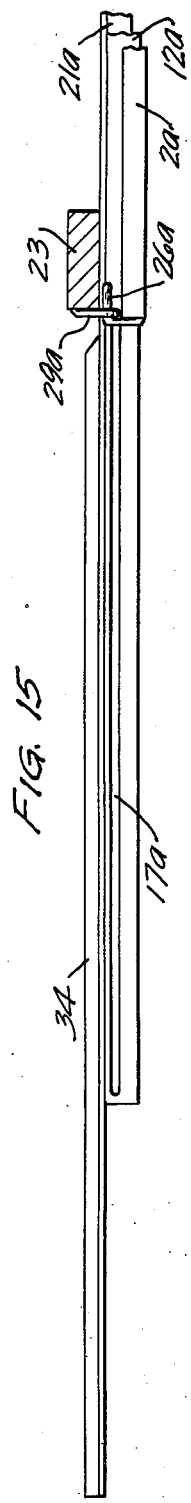
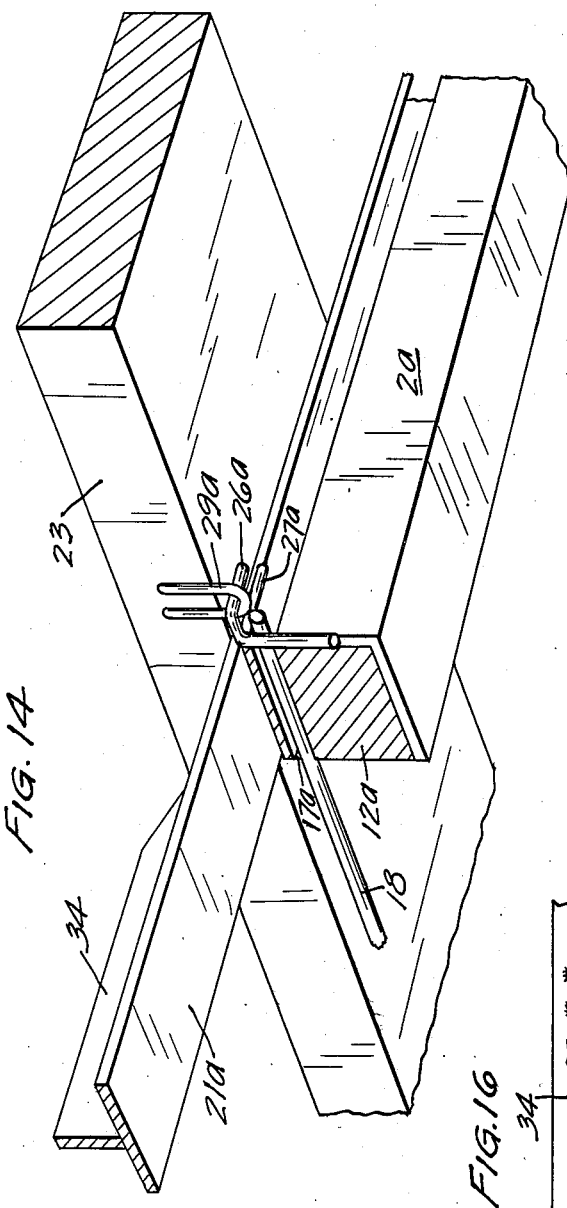
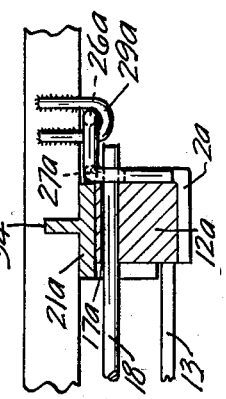
INVENTOR
LAWRENCE H. NICHOLAS
BY Mark W. Gehan
ATTORNEY United States Patent Office 2,808,952
Patented Oct. 8, 1957

2,808,952
CARRYING APPARATUS
Lawrence H. Nicholas, St. Paul, Minn.
Application June 13, 1956, Serial No. 591,046
4 Claims. (Cl. 214—450)

This invention relates to and provides apparatus for transporting articles from place to place. More particularly, it relates to apparatus whereby various articles may be carried upon the top of an automotive vehicle. The apparatus of this invention has particular suitability for transporting boats (e. g., rowboats), but its utility is not limited to the carrying of such items.

There has, in recent years, been a marked growth in the tendency of people to travel considerable distances, in their automobiles, to engage in hunting and fishing activities, or merely to vacation at a lake or resort area. Numerous devices have heretofore been marketed whereby people intending to journey, by car, may carry with them items which they will need or desire at the place which they intend to visit. One of the principal items which sportsmen most frequently want to take with them when they travel to the site of their sports activities, is a boat. One of the principal objectives of the present invention is to provide an apparatus whereby one man (without the help of additional persons) may load a boat upon the roof of an automobile, for carrying to some remote point. A further objective of the invention is to provide a carrying apparatus which is simple to manufacture and operate, and which will carry a boat (or other equipment) upon the automobile with maximum safety and security. The apparatus of the present invention may be manufactured at relatively low cost from material which is readily available. It is sturdy, and capable of being subjected to relatviely rough usage over a considerable period of time. My apparatus, which, as above indicated, provides for carrying of the boat upon the automobile roof top, is thus adapted to eliminate the need for a trailer, and the dangers accompanying their usage.

Other objects and advantages of the invention will be apparent as this description proceeds. Referring now to the drawings:

Figure 1 indicates the apparatus of this invention in assembled position (with a boat mounted in the apparatus) on an automobile roof top.

Figure 2 is a view showing the apparatus in the position it occupies while the boat is being loaded upon the automobile roof top.

Figure 3 is a front elevational view of the apparatus (without the boat) as mounted upon the car.

Figure 4 is a detail view showing the manner in which the three principal members of the apparatus are "tied together," at their rear portion, when the apparatus is in mounted position.

Figure 5 is a plan view of the frame which occupies the lowermost position when the apparatus is assembled upon the car.

Figure 6 is a side elevational view of the frame of Figure 5.

Figure 7 is a front elevational view of the frame of Figure 5.

Figure 8 is a plan view of the frame which occupies the intermediate position, when the apparatus is assembled on the car.

Figure 9 is a front elevational view of the frame of Figure 8.

Figure 10 is a side elevational view of the frame of Figure 8.

Figure 11 is a plan view of the frame which occupies the top position when the apparatus is assembled on the automobile.

Figure 12 is a side elevational view of the frame shown in Figure 11.

Figure 13 is a rear elevational view of the frame shown in Figure 11.

Figure 14 is a perspective view of the three frames in assembled position (only fragmentary portions of each frame being shown) to indicate the means for locking the frames together in assembled relationship.

Figure 15 is a fragmentary side view of the three frames, in assembled position, also designed to indicate the frame locking means.

Figure 16 is a fragmentary view of frame portions, likewise showing the locking means.

The apparatus of this invention essentially comprises three frames designated generally by reference characters A, B and C. The first of these frames, frame A, is mounted directly upon the automobile roof top, as shown particularly in Figure 2.

Said frame A comprises a pair of spaced-apart track members 2 and 2a. Said track members are fabricated from angle iron, and are positioned upon cross struts 3 and 3a, so that their upwardly extending "backs" lie outwardly of frame A, as shown particularly in Figure 7. Members 2 and 2a thus provide a track along which frame B may slide when the apparatus is being assembled. Cross struts 3 and 3a may conveniently be fabricated from wood. They provide the means whereby the entire apparatus is affixed to the car. The lower surface of each of said struts is fitted with a section cup, the plurality of which are all designated by reference character 4. Said cups 4 may, of course, be attached to struts 3 and 3a in a number of different ways. In the embodiment of apparatus shown, the cups are attached to struts 3 and 3a by bolts 5 threaded through said struts and into the top of the suction cups. Frame A is made rigid by cross braces 6 and end braces 7 and 7a. Each end of the two struts 3 and 3a is provided with a buckle-strap element 8, which is threaded through hook members 9, which are adapted to fit under rain gutter 10 on automobile 11. Frame A is thus maintained securely upon the car, and serves as a "platform" for the supplementary frames hereinafter referred to. Strap elements 8 may, of course, be tightened and/or loosened, so that frame A will be held tight between them. Although the following dimensions are not critical, I have found it desirable if track members 2 and 2a measure ⅞ inch by 1 inch, in their height and base length, respectively. Frame A may conveniently be of a 6-foot overall length. Its width should be sufficient amply to accommodate a boat, yet be sufficiently narrow to remain well centered upon the automobile roof top.

Frame B, as above indicated, is intended to slide between the upright portions of track members 2 and 2a. Therefore, the longitudinally extending sides 12 and 12a on frame B are spaced apart a distance slightly less than the upright portions on track members 2 and 2a. Said longitudinally extending sides of frame B are rectangular in cross-section: see Figures 3 and 9, for example. If frame A is 6 feet in length (as it preferably is), then frame B should desirably be 10 feet long, so that it will hang over frame A for 2 feet, at each of its ends, when it is centered upon frame A. Sides 12 and 12a, of frame B, are maintained in position, properly spaced apart and rigid, by cross braces 14, 15 and 16. The tip of each of side members 12 and 12a is formed with a slot 17 and 17a. Pin 18, extending transversely between sides 12 and 12a, rides freely in said slots and is adapted to be moved from front end E thereof to rear end D thereof, or vice versa. In use, frame B serves as a ramp, up and down which frame C with boat 19 secured upon it, is moved during the loading and/or unloading operations: see Figure 2, for example. The rear end of frame B is provided with prop 20, so that it will be maintained at the proper incline, when it is being utilized as the ramp: see Figure 2.

Frame C comprises a pair of spaced-apart side members of L-shaped configuration. Said side members are designated by reference characters 21 and 21a. These members 21 and 21a are adapted to ride upon the longitudinally extending sides 12 and 12a of frame B. As hereinabove indicated, sides 12 and 12a are rectangular in cross section. When the device is assembled, the bottom surface of members 12 and 12a each rests upon the base of track members 2 and 2a. One arm of each of members 21 and 21a, when the apparatus is in assembled position, then rests upon the top surface of member 12, or member 12a (as the case may be) while the other arm of said members 21 and 21a extends downwardly along the inner face of sides 12 and 12a. In other words, members 12 and 12a are "sandwiched" between track members 2 and 2a and side members 21 and 21a. The foregoing is particularly shown in Figure 3 of the drawings. Side members 21 and 21a are maintained in position by cross braces 22, and boat supporting boards 23 are affixed to their top surfaces. The rear end of frame C is fitted with cross member 24, upon which wheels 25 are rotatably mounted.

The forward tip of each of said track members 2 and 2a is provided with a pair of hook members 26 and 26a, and 27 and 27a. The rear end of each of said track members 2 and 2a is provided with a single hook member 28 and 28a. The leading edge of the most forward of boards 23 is provided with a downwardly extending hasp at each of its end portions, just beyond side members 21 and 21a. Said hasps are designated by reference characters 29 and 29a.

When the apparatus is being assembled (i. e., when a boat is being loaded upon roof top 11), frame B is raised to inclined position, along the rear end of the automobile, as shown in Figure 2, and pin 18 in said frame is hooked behind hooks 28 and 28a. Said hooks are spaced apart from each other a distance sufficiently great so that they will engage the tips of pin 18 which extend outwardly beyond sides 12 and 12a. When frame B is in the above mentioned "ramp" position, cross pin 18 will lie at forward end E in slots 17 and 17a: see Figure 10 where points D and E are designated. When frame B (and frame C, with boat 19 tied on it by straps 30) is moved upwardly into position parallel with frame A, and slid forwardly along frame A, pin 18 will gradually ride back in slots 17 and 17a. When frame B is brought far enough forwardly along frame A, so that pin 18 in frame B comes into engagement with hooks 27 and 27a, said pin will then be pushed rearwardly until it comes to point D in the slots in side members 12 and 12a. This arrangement permits the forward end of frame B to project two feet outwardly over the forward end of frame A. As above indicated, frame B is preferably ten feet in length (whereas frame A is preferably six feet in length), so frame B will overhang frame A for two feet at the rear end of frame A, as well as at the forward end of frame A.

When frame B has been advanced as far along frame A as it can go (it being permitted to go no further because of the engagement of the tips of pin 18 under hooks 27 and 27a, and the pushing back of that pin to point D in the slots in which it is mounted) hasps 29 and 29a will then be brought into position over hooks 26 and 26a: see Figure 14, for example. Frame C is thus tied to frame A by reason of hooks 26 and 26a passing through hasps 29 and 29a. Frame B is tied to frame A by reason of the tips of pin 18 passing under and being held by hooks 27 and 27a. The entire apparatus (the front portion thereof) is thus held in secure assembled position upon the roof top.

The rearmost of boards 23 is provided with an apertured flange member. End brace 7a, on frame A, is likewise formed with a similar apertured flange member 32. These flange members are so positioned as to be in register when the three frames of the apparatus are in assembled position upon the car. Wing bolt 33 is then threaded downwardly through flange 31, and into flange 32: see Figure 4. The periphery of the aperture in flange 32 may be threaded, so that wing bolt 33 will be held therein without use of a nut. Wing bolt 33, passing through the above mentioned flanges, serves to hold the rear ends of the three frames in proper assembled position.

It should be noted (see Figure 12, for example) that the vertical portion of each of side members 21 and 21a has been removed, at the front end of frame C: Note point F in Figure 12. This is done to permit frame C (i. e., the front portion of that frame) to slide over frame B without catching pin 18 therein. By reason of removal of the vertical portions of L-shaped side members 21 and 21a, at the front of frame C (again note point F in Figure 12), frame C will "ride over" pin 18, and will not catch the same. Rib 34 is formed upon the front tips of each of side members 21 and 21a, to reinforce those said tips.

When the apparatus is assembled upon the automobile roof top, frame C will overlap frame B one foot at each end.

The particular embodiment of the invention heretofore described is illustrative of my invention. It will be apparent, however, that the particular members shown and described could be modified or rearranged without departing from the spirit of the invention. It should be understood that I do not intend to limit myself to the particular elements heretofore referred to, nor do I intend to limit myself in any way except through the claims appended hereto.

What I claim is:

1. Apparatus for carrying goods upon an automobile roof top, said apparatus comprising a first frame, a second frame, and a third frame, said frames being longitudinally slidable in relation to each other, the front end of said first frame being formed with pairs of upwardly extending hooks, said second frame being provided with a transverse pin, one pair of said hooks being adapted to engage end portions of said pin as said second frame is slidably caused to center on said first frame, another pair of said hooks being adapted to engage downwardly extending hasps on said third frame as said third frame is slidably caused to center on said second frame, said first frame being provided with means whereby it may be removably attached to said automobile roof top.

2. Apparatus for carrying goods upon an automobile roof top, comprising a lowermost frame, an intermediate frame and an uppermost frame, said three frames being longitudinally slidable in respect to one another, the front end portion of said lowermost frame being provided with two pair of hook members, said intermediate frame being provided with a transverse, free-riding pin, said pin being adapted to pass under and become engaged by one pair of said hook members as said intermediate frame is slidably caused to center on said lowermost frame, said uppermost frame being provided with a pair of downwardly extending hasps adapted to pass under and become engaged by the other pair of said hook members as said uppermost frame is slidably caused to center on said intermediate frame, said lowermost frame being provided with means whereby it may be removably attached to said automobile roof top.

3. Apparatus for carrying goods upon an automobile roof top, comprising a lowermost frame, an intermediate frame and an uppermost frame, said three frames being longitudinally slidable in respect to one another, the front end portion of said lowermost frame being provided with two pair of hook members, said intermediate frame being formed with slotted sides, a pin extending transversely of said intermediate frame and riding freely in the slotted sides thereof, said pin being adapted to pass under and become engaged by one pair of said hook members as said intermediate frame is caused to slide forwardly in respect to said lowermost frame, said uppermost frame being provided with a pair of downwardly extending hasps adapted to pass under and become engaged by the other pair of said hook members as said uppermost frame is caused to slide forwardly in respect to said lowermost frame, means being provided whereby said frames may be removably attached to said automobile roof top.

4. Apparatus for carrying goods upon an automobile roof top comprising a first frame, a second frame of substantially greater length than said first frame, and a third frame of substantially greater length than said second frame, said frames being slidable in respect to each other, the front end of said first frame being formed with two pair of hooks, said second frame being provided with a transverse, free-riding pin, one pair of said hooks being adapted to engage end portions of said pin as said second frame is slidably caused to center on said first frame, the second pair of said hooks being adapted to engage downwardly projecting portions of said third frame as said third frame is slidably caused to center on said first frame, means being provided whereby said frames may be removably attached to said automobile roof top.

References Cited in the file of this patent

UNITED STATES PATENTS

| | | |
|---|---|---|
| 2,547,083 | Lundgren | Apr. 3, 1951 |
| 2,765,940 | Nelson | Oct. 9, 1956 |